United States Patent [19]

Ritter et al.

[11] Patent Number: 4,866,023

[45] Date of Patent: Sep. 12, 1989

[54] PROCESS FOR THE SHAPING AGGLOMERATION OF PARTICULATE SOLIDS AND SOLIDS PRODUCED BY THE PROCESS

[75] Inventors: Wolfgang Ritter, Haan; Hans-Peter Handwerk, Duesseldorf; Franz-Josef Carduck, Haan, all of Fed. Rep. of Germany

[73] Assignee: Henkel Kommanditgesellschaft auf Aktien, Duesseldorf, Fed. Rep. of Germany

[21] Appl. No.: 193,973

[22] Filed: May 13, 1988

[30] Foreign Application Priority Data

May 15, 1987 [DE] Fed. Rep. of Germany ....... 3716286

[51] Int. Cl.$^4$ .......................... B01J 23/26; B01J 23/40; B01J 23/72; B01J 23/74
[52] U.S. Cl. .................................. 502/174; 502/180; 502/185; 502/259; 502/261; 502/262; 502/318; 502/337; 502/339; 502/355; 502/527; 23/313 R
[58] Field of Search ............... 502/185, 318, 337, 339, 502/527, 174, 180, 259, 261, 262, 355; 23/313 R

[56] References Cited

U.S. PATENT DOCUMENTS

| | | | |
|---|---|---|---|
| 3,264,069 | 8/1966 | Getty | 23/313 R |
| 4,145,314 | 3/1979 | Fung et al. | 502/185 X |
| 4,657,880 | 4/1987 | Lachman et al. | 502/527 X |
| 4,670,181 | 6/1987 | Mollinger et al. | 23/313 R |

FOREIGN PATENT DOCUMENTS

| | | |
|---|---|---|
| 0167690 | 1/1986 | European Pat. Off. . |
| 2351120 | 4/1975 | Fed. Rep. of Germany . |
| 1255593 | 1/1961 | France . |
| 2261063 | 2/1975 | France . |
| 1487667 | 10/1977 | United Kingdom . |
| 1595054 | 8/1981 | United Kingdom . |

*Primary Examiner*—W. J. Shine
*Attorney, Agent, or Firm*—Ernest G. Szoke; Wayne C. Jaeschke

[57] ABSTRACT

A process for producing shaped, agglomerated, particulate solids, by combining finely divided solids with a polymeric binder solution and curing the combination with polyvalent metal cations; and the products of such process.

37 Claims, No Drawings

PROCESS FOR THE SHAPING AGGLOMERATION OF PARTICULATE SOLIDS AND SOLIDS PRODUCED BY THE PROCESS

BACKGROUND OF THE INVENTION

Field of the Invention

This invention relates to a new proceess for the shaping agglomeration of finely divided particulate solids using binders and to the use of the new agglomeration process for the production of, in particular, free-flowing granular materials which may be used for a variety of applications. More particularly, the invention seeks to use (in a conceptionally new formulation), reactive binder systems which are converted from the soluble into the insoluble state in the course of the process. The measured use of these auxiliaries in the multi-stage process described in the following provides for a simplified and economic process for the production of, in particular, pourable and free-flowing agglomerates which may contain a wide range of inorganic and/or organic components as valuable material.

SUMMARY OF THE INVENTION

This invention affords a process for producing shaped, agglomerated, particulate solids, wherein
I. In a Preliminary Phase:
  (A) a polymeric binder having available anionic acid moieties (particularly suitable for forming insoluble salts), is dissolved in
  (B) a liquid carrier, (preferably water); to form a solution and then in a
II. First Phase:
  (C) finely divided solids which are to be shaped and agglomerated, and
  (D) the solution of (A+B), are mixed together until they become a shapeless, viscid mass, and then optionally are shaped; after which, in a
III. Second Phase:
  (E) the amorphous mass (C+D), is combined with
  (F) a solution (preferably aqueous) containing dissociated (preferably polyvalent) metal cations (which are capable of reacting with the anionic moieties of the polymeric binder), so as to form shaped particulates, which cations are minimally present in an amount sufficient to react with sufficient anionic acid moieties in binder A to form shaped agglomerated particulate solids.

According to the invention, the new process for the shaping agglomeration of finely divided particulate solids suspended in a liquid phase using a binder is characterized in that: the binders used are polymers which are soluble in the liquid phase selected and which contain acid groups suitable for forming insoluble salts which may even be present in the form of soluble salts. The binders dissolved in the liquid phase are mixed with the particulate solids to be agglomerated to form a paste-like formable mass. This mass is shaped and then combined in shaped form with a solution of cations which react with the acid groups of the polymeric binder to form the insoluble solid.

Accordingly, the first step of the process according to the invention is characterized by the selection and combination of the following elements:

The valuable materials to be agglomerated are used in sufficiently finely divided form together with a liquid phase in which these valuable materials are at least partly and, preferably, at least predominantly insoluble so that finely divided solids suspensions can be formed. At the same time, a polymeric binder is used which, in this first step of the process, is soluble in the liquid phase selected, but contains certain functional groups which readily enable the soluble polymer subsequently to be converted into the insoluble state. In the context of this invention, the above functional groups are acid groups which are suitable for forming insoluble salts between the utilized polymeric binder compound and the utilized (preferably polyvalent) metal cations.

The multi-component mixture of liquid phase, dissolved polymeric binder and suspended solids is formed into the desired three-dimensional shape of the agglomerate particles to be produced and is then exposed to the effect of cations of the type which react with the acid groups of the polymeric binders to form the insoluble solid. It has been found that the salt-forming reaction, which is normally spontaneous, results in such rapid solidification of, initially, the outer regions of the shaping multi-component body that adequate stabilization of the predetermined shape and prevention of unwanted caking together of the agglomerate particles are guaranteed. In an optional afterreaction phase, the stabilization and solidification by formation of the insoluble polymer salts may be allowed to advance into deeper layers of the particular agglomerate, penetrating to the point where the material as a whole solidifies.

DESCRIPTION OF THE PREFERRED EMBODIMENTS

Other than in the operating examples, or where otherwise indicated, all numbers expressing quantities of ingredients or reaction conditions used herein are to be understood as modified in all instances by the term "about".

In the preferred embodiment, the process according to the invention uses two liquid-containing phases which are combined in the course of the process to form a single system. Intermiscible liquids are used in the two phases, which are initially kept separate. Since the salt formation on the polymeric binder is the crucial step for permanent shaping, it is of particular advantage to use aqueous or aqueous/organic liquids. Water is preferably used as the liquid in both the first reaction phase and the second reaction phase of the system.

The multi-phase component of the process according to the invention which contains the solid to be agglomerated and the polymeric binder is described first in the following. In the interests of simplicity, the solvent is generally characterized as water although, as already mentioned, the teaching according to the invention in its broadest sense is not confined to water but may include one or more alcohols, or any other organic solvents for both the polymer and metal cation salts.

Particulate Solids

The material to be agglomerated is generally present in the form of powders or as a free-flowing solid or mixture of solids all of which are substantially insoluble in the aqueous phase. Examples of such materials are metal powders, insoluble metal compounds, (such as corresponding metal oxides or metal sulfides), insoluble metal salts, (for example metallic mixed oxides), and the like. The materials in question are components which are themselves the valuable material for the intended use of the agglomerate, or may be converted into the active valuable material in situ by suitable reaction of the agglomerate, for example by reduction or oxidation.

In addition to or instead of the above inorganic components, finely divided solids based on carbon or carbon compounds which are insoluble in the liquid phase also may be agglomerated by the process according to the invention. One particularly important example in this regard is active carbon which may be used on its own, (for example for the production of active carbon beds), or together with metallic and/or other inorganic components of the above types. Important application for such combinations are in the field of catalyst production, for example in the simplified production of granular, free-flowing catalysts. However, the process according to the invention also comprises the shaping agglomeration of insoluble, finely divided organic components of any kind, under the generally mild and gentle conditions of the inventive process.

Polymeric Binders

Suitable water-soluble binders are polymer compounds of natural and/or synthetic origin which contain suitable salt-forming anionic groups in the polymer structure. Acid groups of this kind are, in particular, derived from carboxylic and/or sulfonic acids, although the invention is by no means limited to such groups. Other groups acting as anions and suitable for forming insoluble salts are equally suitable.

Preferred binders of natural origin are soluble, (in particular water-soluble), polysaccharide derivatives containing corresponding salt-forming anionic groups. Preferred such binders are carboxymethyl cellulose, carboxymethyl starch and/or carboxymethyl-substituted guar compounds. Instead of the carboxymethyl groups specifically mentioned here, it is possible to use other carboxyalkyl or polysaccharide derivatives of the type containing anionically active acid moieties substituted directly on the polysaccharide matrix.

Synthetic water soluble polymeric binders may be used in addition to or instead of binders of natural origin. Corresponding anionically reacting synthetic polymers include homopolymers and/or copolymers of lower ($C_{1-6}$), olefinically unsaturated mono- and/or polycarboxylic acids. Suitable starting monomers containing carboxyl groups are, in particular, lower $\alpha$, $\beta$-unsaturated carboxylic acids, more especially acrylic acid and methacrylic acid, and corresponding lower olefinically unsaturated dicarboxylic acids, more especially maleic acid or maleic anhydride. Also suitable are acryloyloxypropionic acid, crotonic acid, itaconic acid, itaconic anhydride, isocrotonic acid, cinnamic acid, semiesters of maleic acid and fumaric acid, such as maleic acid monobutyl ester and fumaric acid, and the like. The properties of the polymeric binder may be varied in several ways and adapted to the requirements of the invention through the choice of the type and quantity of the monomeric constituents containing acid moieties and/or of the copolymers copolymerized with these unsaturated carboxylic acids.

Anionic polymers particularly suitable for use as watersoluble binders are ethylene/maleic anhydride copolymers containing up to about 50 mol-% maleic anhydride and vinyl methyl ether/maleic anhydride copolymers of comparable maleic anhydride content. One example of a suitable polyemric sulfonic acid compound is poly-2-acrylamido-2-methylpropane-sulfonic acid.

An important property of the polymeric binder is its adequate solubility in the aqueous medium, to ensure homogeneous distribution of the binder throughout this reaction component. Another important property is that the inventive binders may also be used in the form of their water-soluble salts. Suitable water-soluble salts are in particular alkali salts, ammonium salts, amine salts and polyamine salts. For example, the adequate solubility in water of polymeric binders of the described type in this reaction component may be established by alkalizing this reaction component with sodium, pH values of from 8 to 13 being suitable. The selected concentration of anionically reacting acid groups in the polymerized binder influences the crosslinking density formed during the reaction with the cationic second reaction component. Furthermore, particularly temperature-stable binders may be used by employing copolymers of the above-mentioned lower unsaturated mono- and/or polycarboxylic acids with, in particular, lower $\alpha$-olefins.

It has been found to be of advantage in the process according to the invention to use polymeric binders containing at least 5 mol-%, preferably at least 20 mol-%, of monomers containing acid moieties. Particularly suitable copolymers contain approximately 20 to 60 mol-% lower carboxylic acid units of the type mentioned which are copolymerized with lower $\alpha$-olefins, such as ethylene and/or propylene, and/or with other olefinic components, such as mehtyl vinyl ether.

Suitable water-soluble polymeric binders of the above-mentioned type have number average molecular weights (MN) of 500 to 5,000,000 preferably 1,000 to 500,000. Preferred binder concentrations in the first reaction phase are minimally an agglomeration-effective amount, preferably 1-30, more preferably 2-20, most preferably 2-10% by weight based on the combined weight of the formable paste-like mass of water, polymeric binder and solid to be agglomerated. The concentration of the polymeric binder and its average molecular weight influence the viscosity of the multi-component mixture of water, binder and finely divided solids which is to be processed by shaping or forming. The viscosity of the multi-component mixture may be selected within a wide range, depending upon the particular procedure adopted, as described below in further detail. Suitable viscosities of the solids suspension are 100 to 2,000,000 mPa.s. Fluid to paste-like formable solids suspensions containing 1 to 15% by weight polymeric binder, 10 to 60% by weight finely divided solid, and 20 to 90% by weight water (the percentages by weight are based in each case on the three-component mixture of water, binder and finely divided solid) have proven to be particularly suitable.

Particulate Formation Process

The suspensions containing the binder and the finely divided solid may be shaped or formed by, in particular, two types of process, although all other mechanical processes are contemplated by this invention.

A first embodiment uses comparatively thin-flowing solids suspensions which preferably have viscosities of around 100 to 4,000 mPa.s. Fluid masses such as these may be solidified in shaped form after adequate homogenization by dropwise addition of this multi-phase mixture to a solution of the precipitating metal ions. The solidification of such low viscosity shapeless masses may be considered "precipitation", in that the shapeless mass, upon contact with the cationic solution, will form insoluble solids and sink to the bottom. Use of the term "precipitation" herein thus may be distinguished from the usual "precipitating out" from solution. Depending on the particular process conditions selected, roughly lenticular to spherical reaction bodies are generalloy obtained, assuming their shape directly upon entering the aqueous solution of the precipitating cations and largely retaining it in the further course of the process. Depending on the process conditions selected, it is possible to obtain largely filled, possible even hollow, sphere-like precipitation products of the described type.

In a second embodiment, a comparatively highly viscous suspension containing binders and finely divided solids (having a viscosity of 2,000 to 2,000,000 mPa.s.), is formed under the effect of mechanical forces and then introduced into the cationic precipitation solution, if desired after size-reduction. For example, filament-like strands may be introduced (as such or after size-reduction) into the solution of the precipitating cations and solidified therein by cross-linking of the binder through salt formation. If desired, the solidified material may be further size-reduced mechanically, even after the second reaction phase.

Cationic solutions

The reactant used to crosslink the polymeric binder by salt formation is a preferably aqueous solution of at least one dissociating salt of which the cations react with the anionically reacting acid moieties of the polymeric binder to form insoluble salts which precipitate from or are formed during the second reaction phase. Virtually any metal cations are suitable for this purpose, although selected (especially polyvalent) cations may be particularly important for reasons of stability and/or with regard to the intended application of the solidified masses. Suitable cations in this connection include calcium, barium, magnesium, aluminum and/or heavy metals, such as divalent copper, iron, chromium, zinc, nickel and/or cobalt. Of these, the aluminum, calcium, copper, ferric iron and ferrous iron are preferred. Divalent copper is particularly effective, leading to optimal results for many applications, particularly in the form of an aqueous sulfate solution. Suitable polyvalent metal salts besides copper sulfate include aluminum chloride, calcium chloride and corresponding sulfate salts and also corresponding salt solutions of divalent and trivalent iron, chromium, manganese and barium.

The aqueous metal salt solutions used in the second reaction phase may contain the corresponding salts of the polyvalent metal ions in quantites of from about 1% by weight to saturation, preferably 3 to 20% by weight, based on the salt solution total weight. Approximately 10% by weight copper sulfate solutions have proven to be a universal precipitant/crosslinker for the process according to the invention. In general, no particular significance is attributed to the anion of the cationic salt solution, providing unwanted interference through reaction with other constituents of the multi-component mixture can be ruled out from the outset on the strength of general chemical knowledge. Thus, the anion associated with the polyvalent metal cation need only be one which freely dissociates and for which the cation has lower affinity than the free anionic moiety of the polymeric binder.

The temperature for the second reaction phase may be selected from virtually the entire temperature range in which aqueous solutions are typically used, i.e. from about 0° to 80° C.

The minimum content of cations in the second reaction phase salt solution can be established by stoichiometric considerations in consistency with the content of available acid moieties from the other (polymeric binder) reaction component. It is not necessary to use stoichiometric ratios. The crosslinking of even some of the anionic acid moieties in the polymeric binder by polyvalent metal cations may be sufficient for adequate crosslinking of the binder and hence of the shaped mass. However, it may be preferable to use at least substantially stoichiometric quantities of the cations, and generally an excess concentration.

In one important embodiment of the process according to the invention, the reaction component containing the shaping binder and the solid to be agglomerated is introduced into an excess of aqueous cations solution and, if desired, the mass to be solidified is allowed to remain in this precipitation solution for a time adequate to achieve the desired degree of hardening. For example, ratios of the mass to be solidified to the aqueous cationic solution of 1:2–10 parts by volume have proven effective. this ensures that the viscid solid (granular or bead-like) reaction component introduced into the aqueous cationic solution is fully engulfed and, if desired, thoroughly wetted by an excess of the polyvalent metal cation solution. This embodiment is particularly suitable for comparatively fluid or thinly pasty reaction mixtures which, for example, are added dropwise to the cation solution. In other embodiments of the invention, however, it is also possible to prepare comparatively solid, (i.e. higher viscosity) shaped reaction mixtures based on the polymeric binder, aqueous phase and solid to be aggomerated, and to spray these mixtures after shaping with a sufficient quantity of the cation solution, for example a thin layer.

As already mentioned, it may be desirable to keep the initially solidified material in contact for a certain time with the solution containing the metal ions to initiate thorough mixing of the viscid mass and cationic solution and hence pervasive salt formation in the solid. If desired, the solidified bodies separated from the excess precipitation solution may be washed and dried.

Subsequent modification of the surface of the solidified bodies may be appropriate for certain applications. It has been found that the bodies obtained may have more or less smooth or compact surfaces according to the process conditions selected. Where the shaped bodies have an undesirably smooth and compact surface, the surface may be opened, i.e. made porous, and thus adapted to the previous overall structure of the material formed by simple mechanical and/or chemical treatment. For example, a solid formed according to this invention in granular or bead-like form may simply be rolled as such, in which case minimal abrasion of its surface is all that is necessary to reestablish direct access to the porous inner structure of the grains or beads. However, treatment with suitable solvents may produce the same result.

In cases where it is desired to subject the shaped solids (which already have been solidified by salt formation) to an after-reaction in the precipitation solution, the shaped solids may be left in the cation solution as long as is necessary for substantially all the polymeric available acid moieties to react with the cations of the solution, and preferably for a period of up to 45 minutes. In general, a residence time of 20 to at most 30 minutes is sufficient for thorough hardening of formed granular material having an average grain size of up to about 10 mm.

Accordingly, the invention affords in particular the use of the above-described shaping agglomeration process for the production of free-flowing granular materials having average particle sizes of from about 1 to 10 mm and preferably of from about 2 to 7 mm, from finely powdered starting materials of virtually any fine particle size.

Solids to be agglomerated

Specific examples of the finely divided solids to be agglomerated may be deduced from the intended application of the shaped bodies produced in accordance with the invention. Of particular importance are typical catalyst componets, for example insoluble compounds or finely powdered metals based on platinum, palladium, rhodium, or nickel, in the absence or presence of supports such as active carbon and kieselguhr, as well as aluminum oxide, calcium carbonate, and the like. Oxidic catalyst components, such as copper chromite, which are insoluble in water, are also particularly suitable for treatment by the inventive process.

In one preferred embodiment of the invention, the process is used for the agglomeration of activated carbon or multicomponent mixtures containing activated carbon ("A carbon") to form corresponding catalysts, for example those containing heavy metals.

To prepare particularly suitable solids suspensions, anionic polymer solutions of the type described previously may be adjusted in the pre-reaction step to a pH of 10 to 13 by addition of aqueous sodium hydroxide, after which the solids to be aggomerated are incorporated. These solids suspensions are then introduced into the cation-containing bath, which preferably is an aqueous solution containing 5 to 15% by weight copper sulfate, the ratio by volume of the aqueous precipitation solution to the volume of the material to be crosslinked preferably being 2–10:1. The agglomerated granular material may remain in the bath, for 15 minutes, advantageously at a moderately elevated temperature (40° to 60° C.). The excess cationic solution is then separted and the agglomerated and hardened material washed with water and dried.

The shaped solids according to this invention may be dried, for example, in recirculating air at temperatures above 100° C. or by any other means. Originally shiny looking surfaces may be converted into dull porous surfaces by brief rolling on a roll stand or by brief storage in a 0.1% ammonia solution.

The following Examples illustrate typical procedures for the production of agglomerated solids according to this invention.

EXAMPLES

1. General procedure for the preparation of dropped shaped bodies

Starting materials
Polymers:
(a) carboxylmethyl cellulose (CMC) (Henkel Corporation, sold as CMC/Relatin TM 7000)
(b) ethylene/maleic anhydride copolymer (Monsanto Company, sold as EMA TM 21)
(c) vinyl methyl ether/maleic anhydride copolymer (GAF Company, sold as Gantrez TM AN 139)
Distilled water
Sodium hydroxide, 50% solution
Copper (II) sulfate x 5 water (MW 249.68)
Procedure:

In a pre-reaction step, CMC was dissolved in water. The solution obtained had a pH or 7–8. EMA TM 21 or Gantrez TM AN 139 were stirred into distilled water and the mixture adjusted to pH 11.0 with 50% sodium hydroxide solution (pH meter).

Depending on the stirring conditions and the size of the batch, the polymer solution underwent an increase in temperature to 45–50° C. In the first reaction step, the particular fine particle solid to be treated was introduced in portions into this warm solution and dispersed therein.

The following procedure has proven to be appropriate, depending upon the size of the batch.

TABLE 1

| Quantity of slurry | Stirrer type | Stirrer speed r.p.m. | Dispersion time in mins |
|---|---|---|---|
| 100 g | propeller stirrer | 2000 | 10 |
| 6000 g | dissolver φ 80 mm | 2800 | 20 |

For the second reaction step, after dispersion, the warm slurry was poured into a V4A vessel having a 2 or 4 mm diameter orifice in its base (depending on the viscosity of the slurry) and added dropwise into an aqueous solution of polyvalent cations, to form unhardened shaped bodies.

After remaining in the cation bath for 15 minutes (as an after-treatment), the hardened shaped bodies were isolated by filtration under suction and subsequent washing with water. The moist shaped bodies were dried at 125° C. in a recirculating air drying cabinet.

1.1 Slurry pH variation

Taking the production of shaped bodies of copper chromite powder as an example, the influence of the pH of the slurry used on the properties of the shaped bodies was demonstrated.

Through the dispersion of copper chromite (BET =25–47 m$^2$/g) in the aqueous polymer solution having a pH of 11.0, the pH changed to 9.0–9.4. However, when the pH was purposely raised to 9–11, the strength of the beads deteriorated so that the slurries were only further processed at pH 9. The pH is therefore preferably adjusted for maximum product strength, to a value which will vary with the particular salt used as the polyvalent cation source.

1.2 Variation of the cationic bath volume

The influence of the cationic bath volume used on the properties of the shaped bodies was determined in the production of shaped copper chromite bodies by dropwise addition of a copper chromite/polymer slurry to copper sulfate solution.

Basic formulations:

| (1) | EMA TM 21 6% | Water/NaOH 54% | K13/Cu-Cr catalyst 40% |
|---|---|---|---|
| (2) | Gantrez TM AN 139 5% | Water/NaOH 55% | K13/Cu-Cr catalyst 40% |

In each case, quantities of 100 g slurry were added dropwise to different quantities of 10% CuSO$_4$ solutions.

TABLE 2

| Basic formulation of slurry | Ratio by volume slurry:CuSo4 solution | Orifice φ (mm) | Appearance of shaped bodies after drying at 125° C. | Strength in N at room temperature |
|---|---|---|---|---|
| 1 | 1:10 | 3 | beads | 22 |
|   | 1:7.5 | 3 | beads | 22 |
|   | 1:5 | 3 | beads | 25 |
|   | 1:5 | 2 | beads | 23 |
|   | 1:4 | 3 | beads | 20 |
|   | 1:3 | 3 | beads | 20 |
|   | 1:2 | 3 | beads, some | 20 |
|   | 1:1 | 3 | beads, some split | 15 |
| 2 | 1:10 | 2 | beads | 17 |
|   | 1:5 | 2 | beads | 15 |
|   | 1:3 | 2 | beads | 15 |

Table 2 shows that the volume of the cationic solution bath can be reduced to a ratio of slurry to $CuSO_4$ solution of 1:3. volume reductions to a ratio of 1:2 or 1:1 have an adverse effect on the stability of the beads (some split beads).

In the tests described in detail in the following, the slurry was generally added dropwise to 10 times the bath volume.

1.3 Strength (N) of the shaped copper chromite bodies as a function of the copper sulfate concentration of the precipitation bath The same basic formulations as described under (1) and (2) in 1.2 were used.

Quantities of 100 g slurry were added dropwise to 1 liter of a cationic bath solution of copper sulfate in the following concentrations.

TABLE 3

| Basic formulation of slurry | Concentration of the precipitation bath on CuSo4 % by weight | Appearance of the shaped bodies | *Hardness in N |
|---|---|---|---|
| 1 | 15.0 | beads | 10 |
|   | 13.5 | beads | 21 |
|   | 10.0 | beads | 25 |
|   | 9.0 | beads | 18 |
|   | 8.0 | beads | 15 |
|   | 7.0 | beads split | — |
|   | 6.0 | beads, split | — |
|   | 5.0 | beads, split | — |
| 2 | 15.0 | beads | 10 |
|   | 13.5 | beads | 17 |
|   | 10.0 | beads | 17 |

*The hardness of the shaped bodies was measured with an instrument for measuring the compressive strength of tablets identified as "Model 4M", sold by Dr. Schleuniger Productronic AG. Hardness was measured at a constant and defined load rate of 20 N/sec. by controlled drive (measurement range : 5-300 N).

The hardness of the shaped bodies was measured with an instrument for measuring the compressive strength of tablets identified as "Model 4M", sold by Dr. Schleuniger Productronic AG. Hardness was measured at a constant and defined load rate of 20 N/sec. by controlled drive (measurement range: 5-300N).

As can be seen from Table 3, a 10% concentration of $CuSO_4$ in the cationic bath produces the best properties with regard to the hardness (N) and stability of the shaped bodies.

Excessively high or excessively low concentrations of $CuSO_4$ in the cationic bath lead to reduced strengths of the shaped bodies.

1.4 Replacement of $CUSO_4$ by other cations

The polymer/catalyst dispersions of known formulation were added dropwise to the following divalent and trivalent cationic solutions (10% by weight) and isolated: $Ba^{2+}$; $Ni^{2+}$; $Fe^{2+}$; $Fe^{3+}$; $Zn^{2+}$; $Ca^{2+}$; $Mn^{2+}$; $Cr^{3+}$; $Co^{2+}$; $Al^{3+}$.

It was found that all the cation solutions shown are suitable to a greater or lesser extent for hardening the shaped catalyst bodies, $Ca^{2+}$, $Al^{3+}$, $Fe^{2+}$ and $Fe^{3+}$ solutions being particularly suitable.

1.5 Increasing the activity of the shaped bodies

Shaped bodies were produced by the described inventive procedure and partially subjected to a mechanical or a chemical surface treatment to increase their activity.

(a) Mechanical treatment: 30 minutes - rolling on a roll stand (Multifix)
(b) Chemical treatment: 5 minutes - in a 0.1% ammonia solution Visually, the originally shiny surfaces had changed to dull and porous.

Unless otherwise specifically stated in the tests described in the following, cationic solution bath concentrations of 10% by weight were used. Accordingly, only the following parameters were changed in the following tests:

1. polymer
2. polymer concentration in the slurry
3. solid particles
4. concentration of the solid particles
5. counter-ion effect 2. Shaped bodies produced with CMC as binder

TABLE 4

| Composition of the slurry | | | Cation | Shaped body | |
|---|---|---|---|---|---|
| CMC % by wt. | Solid type | % by wt. | in solution: | Appearance | Strength N |
| 1.0 | Cu chromite | 25 | $Cu^{2+}$ | beads | 8.6 |
| 1.0 | Cu chromite | 17 | $Cu^{2+}$ | beads | 8.0 |
| 1.0 | Cu chromite | 10 | $Cu^{2+}$ | beads | 5.0 |
| 1.0 | Cu chromite | 25 | $Fe^{2+}$ | lenticular | 6.0 |
| 1.0 | Cu chromite | 25 | $Al^{3+}$ | lenticular | 5.0 |

3. Shaped bodies produced using EMA ™ 21 as binder

TABLE 5

| Composition of the slurry | | | Cation in solution: | Shaped body | |
|---|---|---|---|---|---|
| EMA ™ 21 % by wt. | Solid type | % by wt. | | Appearance | Strength N |
| 3.0 | Cu chromite | 35 | $Cu^{2+}$ | lenticular | 4 |
| 3.0 | Cu chromite | 40 | $Cu^{2+}$ | lenticular | 7 |
| 3.0 | Cu chromite | 45 | $Cu^{2+}$ | lenticular | 22 |
| 4.5 | Cu chromite | 40 | $Cu^{2+}$ | beads | 17 |
| 4.5 | Cu chromite | 45 | $Cu^{2+}$ | beads | 34 |
| 6.0 | Cu chromite | 35 | $Cu^{2+}$ | beads | 13 |
| 6.0 | Cu chromite | 40 | $Cu^{2+}$ | beads | 25 |
| 6.0 | A carbon | 30 | $Cu^{2+}$ | beads | 12 |
| 6.5 | Ni/A carbon | 35.5 | $Cu^{2+}$ | beads | 17 |
| 6.6 | Pd/A carbon | 31.6 | $Cu^{2+}$ | beads | 12 |
| 6.0 | Ni/SiO$_2$ | 35 | $Cu^{2+}$ | beads | 12 |
| 6.0 | CaCO$_3$ | 40 | $Ca^{2+}$ | beads | 37 |
| 7.0 | A carbon | 30 | $Ca^{2+}$ | beads | 23 |
| 6.3 | A carbon | 31.6 | $Cu^{2+}$ | beads | 11 |
| 6.0 | Al$_2$O$_3$ | 40 | $Ca^{2+}$ | beads | 15 |
| 6.0 | Cu chromite | 40 | $Ca^{2+}$ | beads | 10 |
| 6.0 | Cu chromite | 40 | $Al^{3+}$ | beads | 14 |
| 6.0 | Cu chromite | 40 | $Fe^{2+}$ | beads | 20 |
| 6.0 | Cu chromite | 40 | $Fe^{3+}$ | beads | 11 |

4. Shaped bodies produced using Gantrez ™ AN139 binder

TABLE 6

| Composition of the slurry | | | Cation in solution: | Shaped body | |
|---|---|---|---|---|---|
| Gantrez ™ A139 % by wt. | Solid type | % by wt. | | Appearance | Strength N |
| 4.0 | Cu chromite | 45 | $Cu^{2+}$ | beads | 19 |
| 4.0 | Cu chromite | 50 | $Cu^{2+}$ | beads | 30 |
| 5.0 | Cu chromite | 40 | $Cu^{2+}$ | beads | 18 |
| 6.0 | Cu chromite | 35 | $Cu^{2+}$ | beads | 11 |
| 8.0 | Cu chromite | 35 | $Cu^{2+}$ | beads | 6 |
| 4.7 | A carbon | 28.5 | $Cu^{2+}$ | beads | 8 |
| 5.5 | Ni/A carbon | 33 | $Cu^{2+}$ | beads | 8 |
| 4.6 | Pd/A carbon | 27 | $Cu^{2+}$ | beads | 5 |
| 5.7 | Rh/A carbon | 24 | $Cu^{2+}$ | beads | 15 |
| 5.0 | Pt/A carbon | 40 | $Cu^{2+}$ | beads | 2 |
| 5.0 | Ni/SiO$_2$ | 35 | $Cu^{2+}$ | beads | 14 |
| 5.0 | CaCO$_3$ | 40 | $Ca^{2+}$ | beads | 25 |
| 5.0 | CaCO$_3$ | 40 | $Cu^{2+}$ | beads | 10 |
| 5.0 | Al$_2$O$_3$ | 40 | $Al^{3+}$ | beads | 8 |
| 5.0 | Al$_2$O$_3$ | 40 | $Ca^{2+}$ | beads | 5 |
| 5.9 | A carbon | 30 | $Ca^{2+}$ | beads | 11 |
| 5.0 | Cu chromite | 40 | $Ca^{2+}$ | lenticular | 8 |
| 5.0 | Cu chromite | 40 | $Al^{3+}$ | beads | 4 |
| 5.0 | Cu chromite | 40 | $Fe^{2+}$ | beads | 9 |
| 5.0 | Cu chromite | 40 | $Fe^{3+}$ | beads | 11 |

5. Production of shaped catalyst bodies with CuCO$_3$/ZnCO$_3$

TABLE 7

| Polymer | % | Catalyst | % | Appearance |
|---|---|---|---|---|
| Gantrez ™ AN 139 | 5 | Cu/Zn | 40 | porous beads |
| EMA ™ 21 | 6 | Cu/Zn | 40 | porous beads |

Production was carried out in the same way as described in Example 1.

TABLE 7

| Polymer | % | Catalyst | % | Appearance |
|---|---|---|---|---|
| Gantrez ™ AN 139 | 5 | Cu/Zn | 40 | porous beads |
| EMA ™ 21 | 6 | Cu/Zn | 40 | porous beads |

The shaped catalyst bodies were still in the precipitation bath with a stable, compact surface. Only after drying at 100°–125° C. did the beads become porous and unstable.

We claim:

1. A process for producing shaped, agglomerated, particulate solids comprising:
   (I) in a Preliminary Phase, dissolving:
      (A) at least one polymeric binder having available anionic acid-derived moieties, in
      (B) a liquid carrier, to form a solution; and then
   (II) in a First Phase, mixing together:
      (C) finely divided solids which are to be shaped and agglomerated, and
      (D) the solution of (A+B), until they become a shapeless viscid mass (C+D); after which,
   (III) in a Second Phase, combining:
      (E) a solution containing dissociated metal cations capable of reacting with the anionic moieties of the polymeric binder, and
      (F) the shapeless viscid mass (C+D), to form said shaped, agglomerated, particulate solids.
2. The process of claim 1 wherein the liquid carrier of (B) and the solvent of (E) are intermiscible.

3. The process of claim 2 wherein the liquid carrier of (B) and the solvent of (E) individually are: water, an organic solvent, or their mixture.

4. The process of claim 1 wherein the liquid carrier of (B) and the solvent of (E) are both water.

5. The process of claim 1 wherein the binder of (A) is at least one natural or synthetic polymer whose available anionic moieties are carboxylic, or sulfonic acid derived, and which may be partially or entirely in the form of a soluble alkali, ammonium, amine, or polyamine salt.

6. The process of claim 5 wherein the binder of (A) is a: naturally derived water-soluble polysaccharide derivative; synthetic homopolymer and/or copolymer of a $C_{1-6}$ olefinically unsaturated mono- or poly-carboxylic acid; or any mixture thereof.

7. The process of claim 1 wherein the binder of (A) has a number
average molecular weight of about 500 to 5,000,000.

8. The process of claim 7 wherein the solids content of the polymeric binder—based upon the shapeless viscid mass—is about 1 to 30% by weight.

9. The process of claim 1 wherein: the binder of (A) has a number average molecular weight of about 1,000 to 500,000.

10. The process of claim 9 wherein the solids content of the polymeric binder—based upon the shapeless viscid mass—is about 2 to 20% by weight.

11. The process of claim 8 wherein: the binder of (A) contains: at least about 5 mol % of monomer elements having acid radicals; and a temperature stable copolymer having about 20 to 60 mol % of carboxylic acid moieties copolymerized with ethylene, propylene, and/or methyl vinyl ether.

12. The process of claim 11 wherein the binder of (A) contains at least about 20 mol % of monomer elements having acid radicals.

13. The process of claim 1 wherein the binder of (A) is at least one of carboxymethyl cellulose; ethylene/maleic anhydride copolymer containing up to about 50 mol % maleic anhydride; vinyl methyl ether/maleic anhydride copolymer containing up to 50 mol % maleic anhydride; or poly-2-acrylamido-2-methylpropane-sulfonic acid.

14. The process of claim 13 wherein the liquid carrier of (B) is water and the solution of (E) is aqueous.

15. The process of claim 1 wherein the solid of (C) which is to be shaped and agglomerated is at least one of: platinum, palladium, rhodium, or nickel, in the absence or presence of a support which is activated carbon or diatomite; aluminum oxide; calcium carbonate; copper chromite; activated carbon itself; or a multicomponent heavy metal mixture containing activated carbon.

16. The process of claim 1 wherein the solid of (C) which is to be shaped and agglomerated is finely divided: copper chromite; activated carbon; nickel on activated carbon; palladium on activated carbon; nickel on diatomite; calcium carbonate; aluminum oxide; rhodium on activated carbon; or platinum on activated carbon.

17. The process of claim 1 wherein the metal cations of (E) are at least one of calcium, barium, magnesium, aluminum, divalent copper, ferric or ferrous iron, chromium, zinc, nickel, or cobalt.

18. The process of claim 1 wherein the metal cations of (E) are: aluminum, calcium, copper, ferric iron, or ferrous iron.

19. The process of claim 1 wherein the metal cations of (E) are obtained from chloride or sulfate salts of said cations.

20. The process of claim 1 wherein the metal cation of (E) is copper derived from copper sulfate.

21. The process of claim 1 wherein:
the polymeric binder of (A) is: carboxymethyl cellulose; ethylene/maleic anhydride copolymer containing up to about 50 mol % maleic anhydride; vinyl methyl ether/maleic anhydride copolymer containing up to 50 mol % maleic anhydride; or poly-2-acrylamido-2-methylpropane-sulfonic acid;
the liquid carrier of (B) is water;
the solid (C) which is to be shaped and agglomerated is finely divided: copper chromite, activated carbon, nickel on activated carbon, palladium on activated carbon, nickel on diatomite, calcium carbonate, aluminum oxide, rhodium on activated carbon, or platinum on activated caron; and
the cation solution (E) is an aqueous solution containing a chloride or sulfate salt of aluminum, calcium, copper, ferric iron, or ferrous iron.

22. The process of claim 21 wherein: said polymeric binder of (A) has a number average molecular weight of about 1,000 to 500,000; and the solids content of the polymeric binder - based upon the shapeless viscid mass—is about 2 to 10% by weight.

23. The process of claim 1 wherein said shapeless viscid mass of (D) comprises:
about 1 to 15% of said polymeric binder of (A);
about 10 to 60% of said finely divided solids of (C);and
about 20 to 90% of water; all percentages being by weight, based upon the total weight of said mass.

24. The process of claim 22 wherein said shapeless viscid mass of (D) comprises:
about 1 to 15% of said polymeric binder of (A);
about 10 to 60% of said finely divided solids of (C); and
about 20 to 90% of water; all percentages being by weight, based upon the total weight of said mass.

25. The process of claim 24 wherein said shapeless viscid mass has a viscosity of about 100 to 2,000,000 mPa.s.

26. The process of claim 1 wherein the cations of (E) are present in about 1% by weight to saturation, based on the total weight of the cation solution.

27. The process of claim 25 wherein the cations of (E) are present in 3 to 20% by weight, based on the total weight of the cation solution.

28. The process of claim 1 wherein:
said First Phase is conducted so that said shapeless viscid mass is thinly flowing and has a viscosity of about 100 to 4,000 mPA.s.; and
said Second Phase comprises adding said shapeless viscid mass dropwise to said solution containing dissociated metal cations; and after formation of said agglomerated particulate solids, keeping the solids in said solution until substantially all the polymeric available acid moieties are reacted with the cations of said solution.

29. The process of claim 25 wherein:
said First Phase is conducted so that said shapeless viscid mass is thinly flowing and has a viscosity of about 100 to 4,000 mPa.s.; and
said Second Phase comprises adding said shapeless viscid mass dropwise to said solution containing dissociated metal cations; and after formation of said agglomerated, particulate solids, keeping the solids in said solution for up to 45 minutes.

30. The process of claim 1 wherein:

said First Phase is conducted so that said shapeless viscid mass has a relatively high viscosity of about 2,000 to 2,000,000 mPa.s.; and said Second Phase is conducted by extruding said shapeless viscid mass and introducing the extrudate into said solution containing dissociated metal cations; and after formation of said agglomerated particulate solids, keeping the solids in said solution for up to 45 mintues.

31. The process of claim 25 wherein:

said First Phase is conducted so that said shapeless viscid mass has a relatively high viscosity of aobut 2,000 to 2,000,000 mPa.s.; and said Second Phase is conducted by extruding said shapelss viscid mass and introducing the extrudate into said solution containing dissociated metal cations;and after formation of said agglomerated particulate solids, keeping the solids in said solution for up to 45 minutes.

32. The process of claim 29 wherein said agglomerated solid particles solids are further processed by:
    reducing them in size; and/or
    roughening of their surface; the further processing being effected by:
    rolling said solids mechanically; and/or
    treating said solids with a chemical compositions.

33. The process of claim 31 wherein said agglomerated solid particles solids are further processed by:
    reducing them in size; and/or
    roughening of their surface; the further processing being effected by:
    rolling said solids mechanically; and/or
    treating said solids with a chemical compositions.

34. The product of the process of claim 1.

35. The product of the process of claim 21.

36. The product of the process of claim 32, having an average grain size of about 1 to 10 mm.

37. The product of the process of claim 33, having an average grain size of about 1 to 10 mm.

* * * * *